United States Patent
Fodor et al.

(10) Patent No.: US 8,452,321 B2
(45) Date of Patent: May 28, 2013

(54) METHOD AND ARRANGEMENT FOR CONTROLLING UPLINK TRANSMIT POWER

(75) Inventors: Gabor Fodor, Hässelby (SE); Timus Bogdan, Spånga (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 164 days.

(21) Appl. No.: 13/051,259

(22) Filed: Mar. 18, 2011

(65) Prior Publication Data

US 2011/0237289 A1 Sep. 29, 2011

Related U.S. Application Data

(63) Continuation of application No. PCT/SE2010/050321, filed on Mar. 24, 2010.

(51) Int. Cl.
*H04B 7/00* (2006.01)

(52) U.S. Cl.
USPC ............ 455/522; 455/69; 455/70; 455/552.1; 455/343.1; 455/343.2; 370/315; 370/316; 370/317; 370/318; 370/320

(58) Field of Classification Search
USPC .............. 455/522, 69–70, 13.4, 550.1, 552.1, 455/343.1–343.4, 556.1, 561; 370/315–320
See application file for complete search history.

(56) References Cited

U.S. PATENT DOCUMENTS

| | | | |
|---|---|---|---|
| 2005/0135312 A1 | 6/2005 | Montojo et al. | |
| 2008/0130728 A1* | 6/2008 | Burgan et al. | 375/222 |
| 2008/0253351 A1 | 10/2008 | Pernu et al. | |

OTHER PUBLICATIONS

International Search Report for International Application No. PCT/SE2010/050321 mailed Dec. 2, 2010.
Qualcomm Europe, "Maximum Power Scaling for DC-HSUPA," R1-092623, 3GPP TSG RAN WG1 Meeting #57bis, Jun. 29-Jul. 3, 2009, Los Angeles, CA, USA, pp. 1-21.
3GPP, "3rd Generation Partnership Project; Technical Specification Group Radio Access Network; Evolved Universal Terrestrial Radio Access (E-UTRA); User Equipment (UE) radio transmission and reception (Release 10)," 3GPP TS 36.101 v10.4.0, Sep. 2011, pp. 1-242.

* cited by examiner

*Primary Examiner* — Fayyaz Alam
(74) *Attorney, Agent, or Firm* — Potomac Patent Group, PLLC (57) ABSTRACT

The present invention relates to methods and arrangements for controlling uplink transmit power to be used by the UE. The UE comprises multiple radio interfaces wherein at least one of the multiple interfaces is a cellular radio interface. The UE stores information comprising a total transmit power budget set aside for use over the multiple radio interfaces of the UE and receives transmit power control commands from a network node on the cellular radio interface indicating whether the UE should increase or decrease or maintain the uplink transmit power on the cellular radio interface. Transmit power levels to be used for uplink transmissions over the multiple radio interfaces based on the received transmit power control commands are calculated, wherein the said total transmit power budget for the multiple radio interfaces is taken into account.

13 Claims, 6 Drawing Sheets

Fig. 1

*Profile information 605*

| | Cellular | Ad-hoc | UE-UE |
|---|---|---|---|
| Profile 1 | 24dBm | 0 | 0 |
| Profile 2 | 18dBm | 6dBm | 0 |
| Profile 3 | 18dBm | 0 | 6dBm |
| Profile 4 | TBD | TBD | TBD |

METHOD AND ARRANGEMENT FOR CONTROLLING UPLINK TRANSMIT POWER

TECHNICAL FIELD

The present invention relates to methods and arrangements in a cellular network wherein the User Equipments (UEs) of the cellular network are enabled with multiple radio interfaces for different radio access technologies (RATs) and support local communication in addition to the cellular communication.

BACKGROUND

Most of the user equipments (UE) today are equipped with multiple radio interfaces supporting access to wireless services over multiple radio access technologies (RATs). State of the art UEs are capable of running multiple Internet Protocol (IP) based applications simultaneously, possibly using several radio interfaces at the same time. In fact, such multi-homing capability is routinely supported by state of the art desktop or laptop computers running IPv6, but multi-homing is supported by state or the art (IPv4) operating systems as well.

Such multi-RAT devices may be engaged in cellular as well as in local adhoc communications sessions simultaneously. For example, a laptop computer or a personal digital assistant (PDA) can be part of a local adhoc network running a peer-to-peer file download or faster-than-real-time streaming, e.g. YouTube, session while running a real time voice or video session over a cellular interface.

In addition, UEs in terms of their maximum output power capability belong to a particular UE power class (PC). For instance in WCDMA (Wideband Code Division Multiple Access) networks, there are several UE power classes namely:
PC4=21 dBm
PC3bis=23 dBm
PC3=24 dBm For instance a WCDMA UE belonging to the PC3, which is the most commonly used power class, can operate at maximum output power equal to 24 dBm.

In LTE, hitherto there exists only one UE power class namely:
PC3=23 dBm

Future LTE-Advanced and IMT-Advanced compliant user equipments may include further UE power classes.

Most electronic devices, including 3 GPP compliant UEs and devices equipped with multiple radio interfaces regardless of their power class must comply with international and various national RF regulatory requirements regarding overall power emission, radio frequency exposure and specific absorption rate (SAR). Although the specific requirements vary in different regions, the International Commission on Non-Ionizing Radiation Protection (ICNIRP) sponsored by the World Health Organization (WHO) recommends guidelines based on consensus of existing scientific results and provides protection against non-ionizing radiation (NIR).

The ICNIRP SAR limits for IMT-2000 terminals are concerned with radiation exposure in the frequency range between 300 Hz and 300 GHz which is the ICNIRP definition of radio frequency (RF), including specific radiation thresholds, measurement methods and other technical details. For example the ICNIRP recommendations specify the so called averaging time (Tavg) which is the appropriate time interval over which the RF exposure is averaged for the purpose of determining compliance with the exposure limits. This averaging time can vary from region to region, but it is roughly in the order of several minutes. However, ICNIRP recommendations also concern short term (in the order of several seconds or tens of seconds) exposure limits that may be higher than those defined for Tavg thus allowing for higher exposures for a short duration of time.

It is important to note that the SAR regulations are concerned with the overall radiation limitation typically given in [Watts/body kg] irrespectively of the used radio interfaces, the number of simultaneously used RATs, accessed RATs, etc.

Another example is when a UE is operating in a frequency band, which is adjacent to or in close proximity of sensitive operations such as public safety systems (e.g. 700 MHz operation in US) or medical installations etc. In these or similar sensitive scenarios, in order to be compliant with the FCC regulatory constraint, the total UE transmit power over all the available radio interfaces, cellular and non-cellular, may have to be limited to a value lower than its maximum output power capability (i.e. power class level) or the total UE transmit power over all the available radio interfaces should at least not exceed its maximum output power capability provided that the regulatory requirements can be met.

A specific example is that of E-UTRA FDD (Evolved Universal Terrestrial Radio Access Frequency Division Duplex) frequency band 13, defined in E-UTRA specification 3GPP TS 36.101, which is adjacent to the public safely frequency band in 700 MHz range. Hence when operating in band 13 in order to limit emissions towards the public safety band in compliance with FCC regulations, the maximum transmit power of the LTE UE with power class 3, i.e. 23 dBm, has to be lowered by several dBs e.g. 10 dBm below the maximum power level. The actual reduction in the maximum transmit power depends upon the number of uplink transmitted resource blocks.

SUMMARY

Thus, the power to be used by the UE is limited by the above described regulatory requirements in addition to the physical limitation concerning the battery capacity.

An object with embodiments of the present invention is to achieve a solution where these limitations can be taken into account when controlling the power of a UE supporting multiple RATs.

This is achieved by storing information comprising a total transmit power budget set aside for use over the multiple radio interfaces of the UE and to use this information when calculating the uplink transmit power levels for the UE.

According to a first aspect of the present invention a method in a UE for controlling uplink transmit power to be used by the UE is provided. The UE comprises multiple radio interfaces wherein at least one of the multiple interfaces is a cellular radio interface. In the method, information comprising a total transmit power budget set aside for use over the multiple radio interfaces of the UE is stored. Transmit power control commands are received from a network node on the cellular radio interface indicating whether the UE should increase or decrease or maintain the uplink transmit power on the cellular radio interface, and transmit power levels to be used for uplink transmissions over the multiple radio interfaces are calculated based on the received transmit power control commands, wherein the said total transmit power budget for the multiple radio interfaces is taken into account.

When calculating the transmit power levels to be used for the UE, the total transmit power budget for the multiple radio interfaces may be taken into account either in the UE or in the network node.

Therefore a method in a network node of a cellular communication network for controlling uplink transmit power to be used by a UE comprising multiple radio interfaces is provided according to a second aspect of the present invention. In the method, information comprising a total transmit power budget set aside for use over the multiple radio interfaces of the UE is received and transmit power control commands are determined for the UE indicating whether the UE should increase or decrease or maintain the uplink transmit power taking said total transmit power budget into account. The determined transmit power control commands are then sent to the UE.

According to a third aspect of the present invention a UE for controlling uplink transmit power to be used by the UE is provided. The UE comprises multiple radio interfaces wherein at least one of the multiple interfaces is a cellular radio interface. The UE comprises a memory for storing information comprising a total transmit power budget set aside for use over the multiple radio interfaces of the UE and a receiver for receiving transmit power control commands from a network node on the cellular radio interface indicating whether the UE should increase or decrease or maintain the uplink transmit power on the cellular radio interface. The UE further comprises a power control unit for calculating transmit power levels to be used for uplink transmissions over the multiple radio interfaces based on the received power control commands, wherein the said total transmit power budget for the multiple radio interfaces is taken into account.

According to a fourth aspect of the present invention a network node, e.g. a base station, of a cellular communication network for controlling uplink transmit power to be used by a UE is provided. The UE comprises multiple radio interfaces. Moreover, the network node comprises a receiver for receiving information comprising a total transmit power budget set aside for use over the multiple radio interfaces of the UE and a power controller for determining transmit power control commands for the UE indicating whether the UE should increase or decrease or maintain the uplink transmit power taking said total transmit power budget into account. The network node also comprises a transmitter for sending the determined transmit power control commands to the UE.

An advantage with embodiments of the present invention is that the UE is able to determine the transmit power levels at the different RAT transmitters such that the power resources are well utilized, as close to the allowed limit as possible, but still compliant with regulatory constraints;

A further advantage is that embodiments of the present invention allow the UE to select the used RATs taking into account the actual valid power regulations. For example, the UE may choose not to use a local communication while being at the cell edge of a cellular system, or to reschedule application sessions accordingly.

A yet further advantage is that embodiments of the present invention allow the UE to automatically adjust its behavior to the specific geographic region when roaming between regions with different regulatory prescriptions rather than requiring the human user to adjust RAT power settings upon roaming.

DETAILED DESCRIPTION

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the present invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
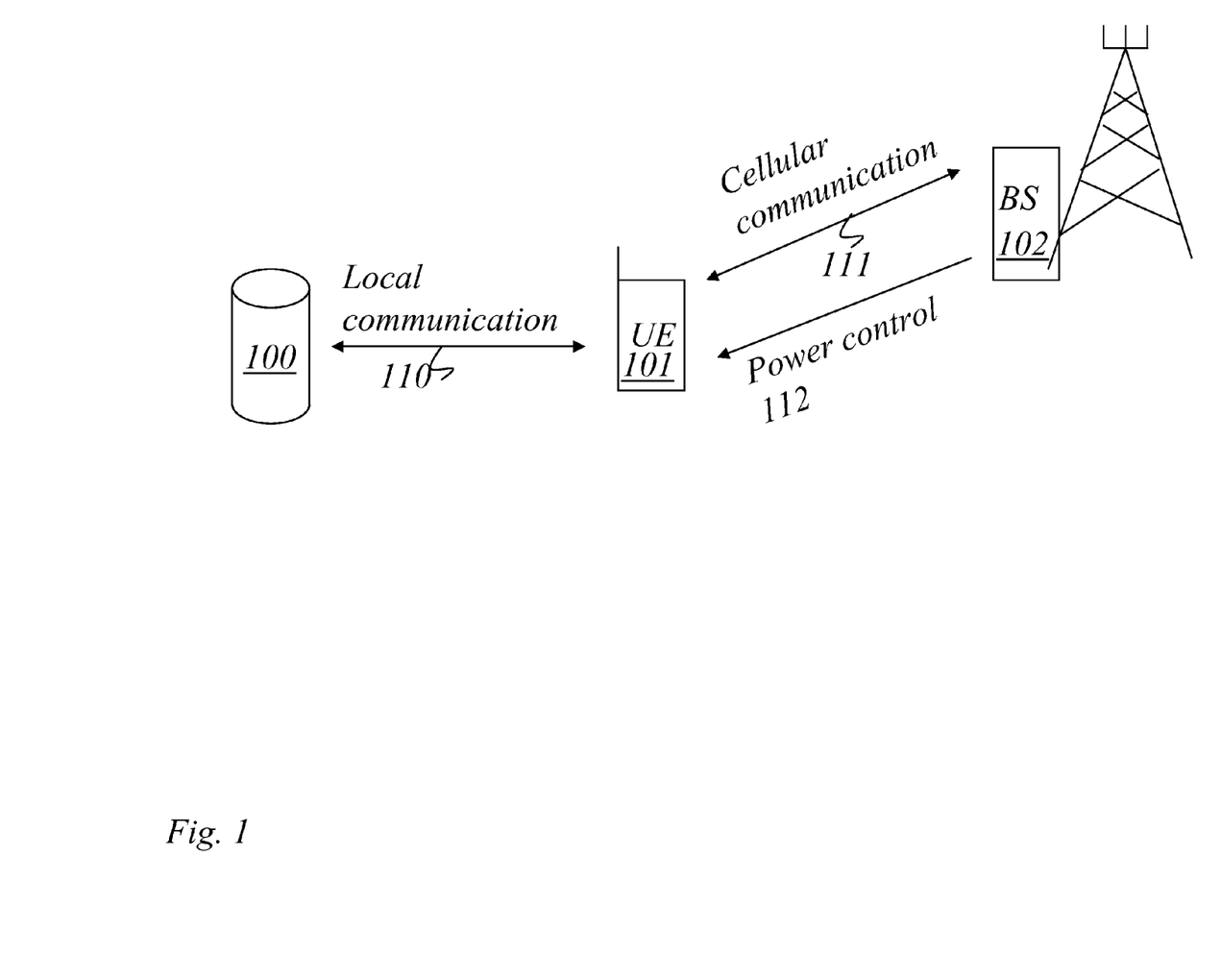
FIG. 1 illustrates a scenario wherein the embodiments of the present invention may be implemented.

Turning now to FIG. 1, which illustrates a problem scenario which the embodiments of the present invention solve. A UE 101 is in FIG. 1 simultaneously involved in a local ad-hoc communication 110 session with a server 100, e.g. a video server, and in a cellular communication 111 session with a cellular network 102. The cellular radio access network uses power control commands, either explicitly, or implicitly by manipulating the parameters of the UE's power control algorithm, such as path loss compensation and SINR target setting, to set the uplink transmit power. When the UE is at cell edge, the UE typically uses full power to communicate with the radio access network (RAN) to reach the SINR target. The RAN power control commands may also lead to a near full power setting for UEs not located at the cell edge e.g. to facilitate high rank transmission etc. Further, in state of the art systems using the so called opportunistic power control algorithm for data traffic the RAN power control commands may also lead to a near full power setting for non cell edge UEs in order to maximize the overall throughput.

This results in that the UEs do not have remaining power/energy to communicate locally with ad-hoc peers or that the UEs are not allowed to use power for local ad-hoc communication due to regulatory restriction constraints such as SAR restrictions. For instance, Bluetooth class 1 devices are allowed to use max 20 dBm on the Bluetooth radio interface. Thus, when a multihoming device uses two or more of its radio interfaces at the same time, the sum transmit power and thereby the sum power emission may easily lead to a SAR that exceeds the allowed values.

Depending on the UE type and its physical construction, battery supply, etc, situations may also occur where the UE is not able to set the correct transmit power at all of its radio interfaces, even if the sum output transmit power does not lead to SAR violation.

To summarize, the problem area that the embodiments of the present invention is applicable to is a multi-RAT environment where the UEs comprise multiple radio interfaces wherein at least one of the multiple interfaces is a cellular radio interface and the UE power control algorithms on the different radio interfaces may conflict with one another due to at least one of the following reasons:

The power supply of the UE can support high transmit power levels at multiple radio interfaces at the same time leading to a SAR level exceeding regulatory thresholds.

A desired transmit power at one or several radio interfaces is not feasible due power supply limitations or other physical limitations.

Hence the problems mentioned above stems from the fact that the overall UE power emission is affected by the RAN power control mechanism as well as the local UE power control algorithm and that the RAN is not aware of the power levels set by the UE for local ad-hoc communication purposes.

According to embodiments of the present invention, the problem is solved by storing information comprising a total transmit power budget set aside for use over the multiple radio interfaces of the UE and by using this information when calculating transmit power levels to be used for uplink transmissions over the multiple radio interfaces based on the received transmit power control commands.

Figure 4A:
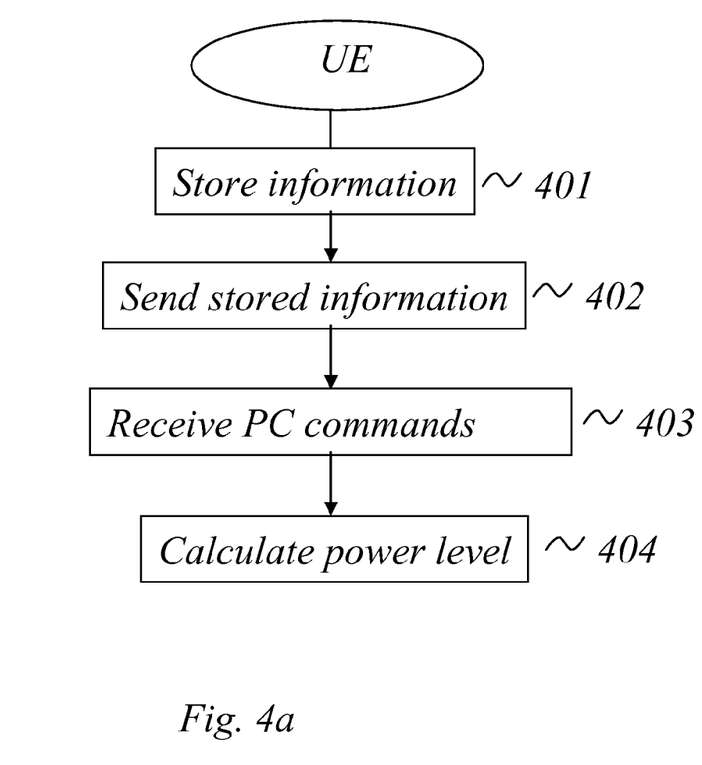
FIGS. 4a and 4b are flowcharts of the methods according to embodiments of the present invention.

In particular, as illustrated in the flowchart of FIG. 4a, information comprising a total transmit power budget set aside, i.e. reserved, for use over the radio interfaces of the UE is stored 401 and transmit power control commands are received 403 from a network node such as a base station, on the cellular radio interface. The transmit power control commands indicates whether the UE should increase or decrease or maintain the uplink transmit power on the cellular radio interface. Further, transmit power levels are calculated 404 to be used for uplink transmissions over the radio interfaces based on the received transmit power control commands, wherein the said total transmit power budget for the multiple radio interfaces is taken into account.

Figure 2:
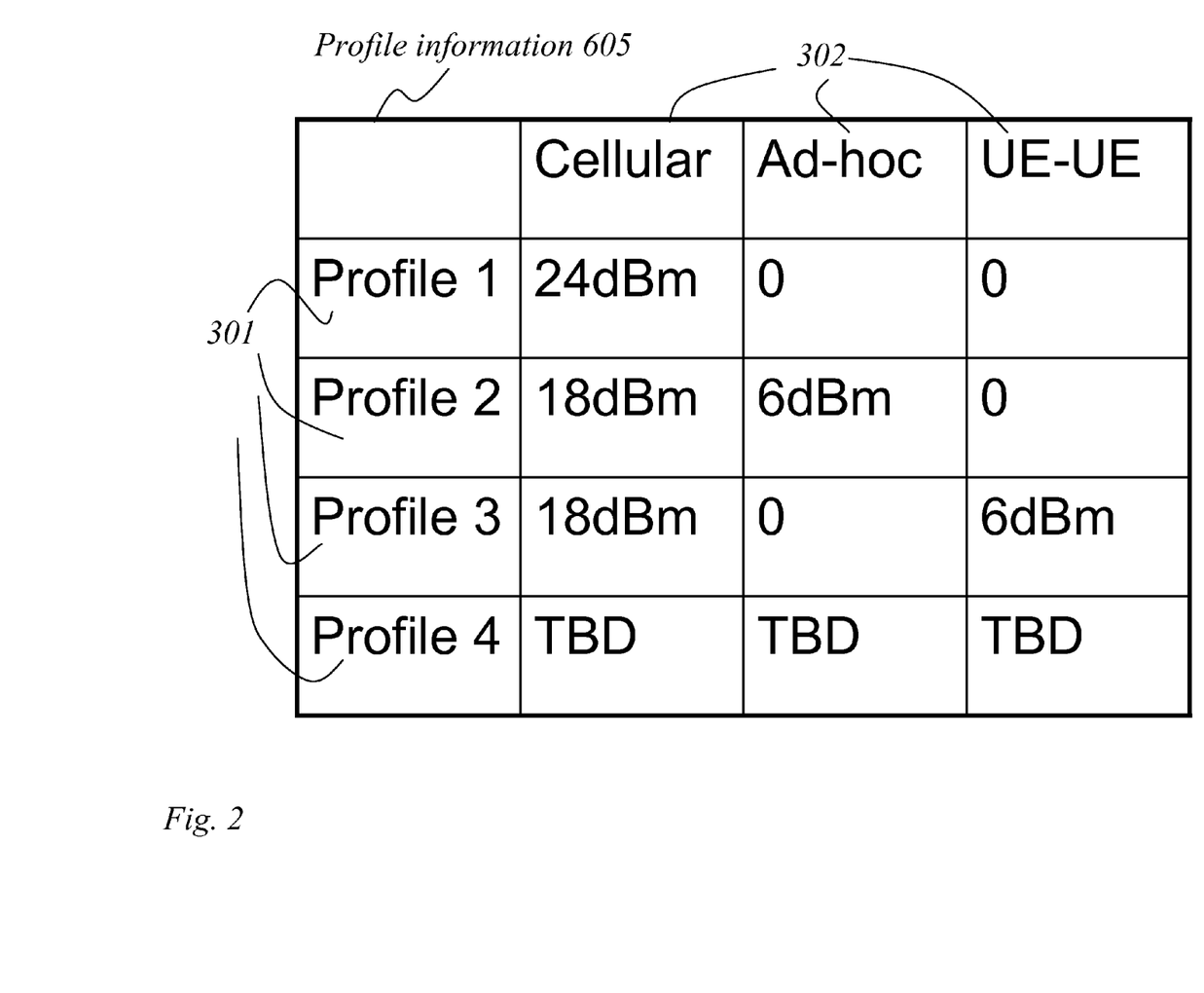
FIG. 2 exemplifies a profile comprising information regarding the power budget for different radio interfaces of a UE.

Moreover, the stored information may comprise profile information comprising at least one profile for a communication scenario indicating at least a first and a second radio interface to be used associated with maximum transmit power levels to be used for the respective radio interfaces as illustrated in FIG. 2. In the profile information table of FIG. 2, four profiles are included; profile 1 indicates that only the cellular radio interface is used, profile 2 indicates that the cellular radio interface and a local ad-hoc interface are used, profile 3 indicates that the cellular radio interface and a UE to UE interface are used and profile 4 contains empty boxes for the maximum transmit levels for the respective radio interfaces. For profile 4, the empty boxes can subsequently be inserted with maximum transmit power levels by receiving such information via access stratum signaling from the network. In order to avoid exceeding SAR limitations and power supply limitations, it should be noted that the sum of the maximum transmit power levels to be used for the respective radio interfaces is not allowed to exceed the total transmit power budget of the UE. According to a further alternative, each of the radio interfaces may further be associated with a respective priority level and/or minimum transmit power level. This is however not shown in the profile information of FIG. 2.

Such profile information may be established at subscription and the profile information may be associated with the SIM (Subscriber Identity Module) of the subscriber. The profile information can be easily modified by means of a light weight non access stratum protocol that allows the UE to request to add or to delete additional profiles upon, for example the installation of a new radio interface or when removing/deactivating a radio interface. The profile information can also be modified by the radio access network when changing subscription data or upon roaming by the visited network. A copy of the profile information can be stored both at the home location register (HLR) or at the visiting location register (VLR) and in the UE. Alternatively, the UE can use access stratum protocols e.g. RRC signaling or layer 1/layer 2 control messages to update its currently serving RAN of the profile information.

Figure 3A:
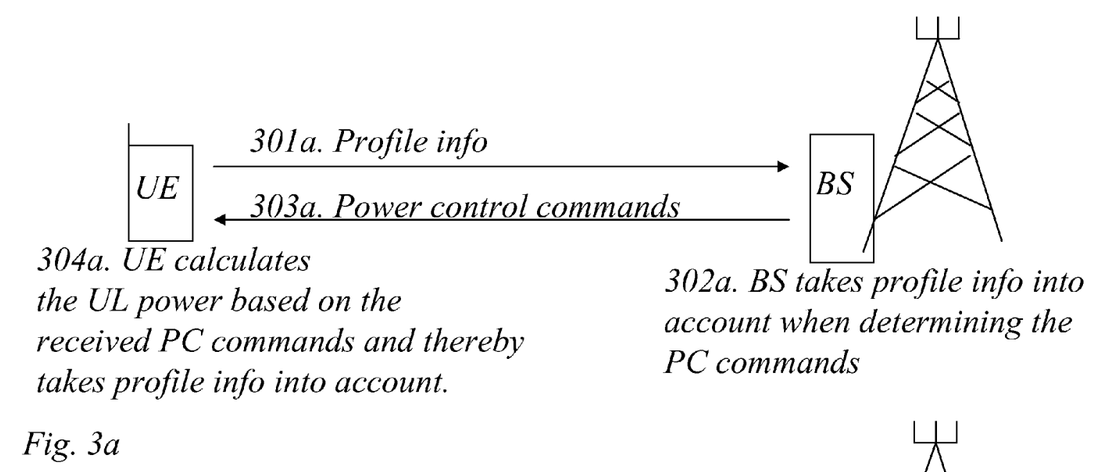
FIGS. 3a and 3b illustrate schematically two embodiments of the present invention.

According to one embodiment as shown in FIG. 3a, the stored information is sent 301a to the network node such that the network node, e.g. a base station, can take 302a the total transmit power budget into account when determining the transmit power control commands to be sent 303a to the UE. The UE calculates 304a the uplink transmit power based on the received transmit power control commands. The UE thereby takes the total transmit power budget into account when determining the uplink transmit power for the different radio interfaces, since the effect of the total transmit power budget is included when determining the transmit power control commands.

Figure 4B:
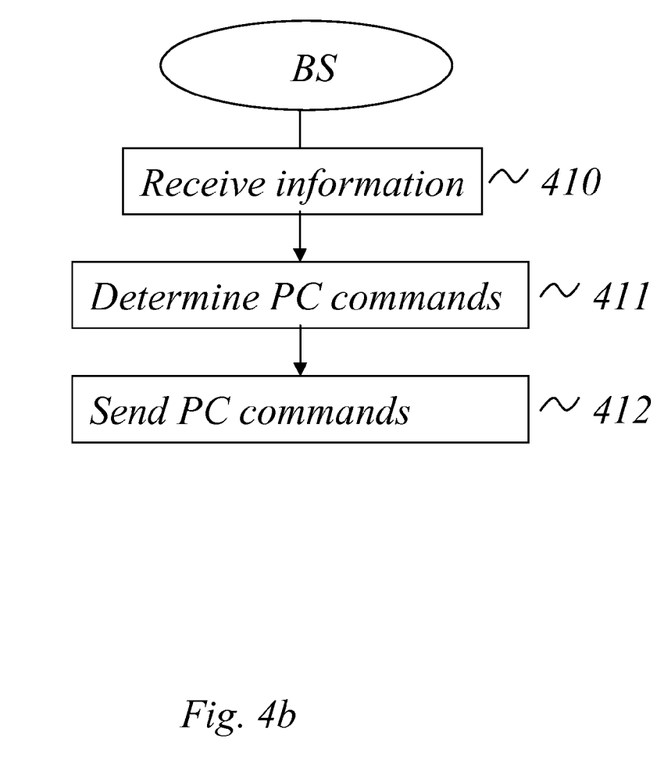

As illustrated in the flowchart of FIG. 4b, the network node exemplified by a base station receives 410 information comprising the total transmit power budget set aside for use over the multiple radio interfaces of the UE. The network node further determines 411 transmit power control commands to be sent to the UE indicating whether the UE should increase or decrease or maintain the uplink transmit power taking said total transmit power budget into account. These determined transmit power control commands are then sent 412 to the UE.

The details of how the network node uses the received information of the total transmit power budget obviously depends on the radio access technology e.g. WCDMA, LTE or other state of the art power control mechanisms. The purpose of the modified power control mechanism for determining the transmit power control commands is to limit the transmit power of the UE on the cellular radio interface according to the current communication profile as exemplified in FIG. 2. In this way, it can be avoided to use all available power for a UE on the cellular interface if communication over other radio interfaces of the UE also is requested. For example, when the current Profile of a specific UE is "Profile 2", a network node of the radio access network (RAN) is aware of the maximum power allowed for the UE for cellular communications. This RAN node takes this into account by using state of the art admission control, since the RAN node now is aware of the maximum interference that this UE can cause to UEs in neighbor cells. The RAN node can also use this specific value regarding the cellular communication (exemplified by 18 dBm) when performing intercell interference coordination mechanisms, since the RAN node knows that the UE cannot raise its power over this limit and thereby it can derive the maximum interference power that this UE can be exposed to. The RAN node can also take this limitation into account at scheduling, since the number of resource blocks, i.e. bandwidth, that the UE can handle and should be scheduled on must be less than for Profile 1, since it becomes power limited at lower number of scheduled resource blocks than what it would with Profile 1.

If the cellular radio access network has a path loss and channel estimate for a given UE, then it can easily estimate the maximum SINR target that should be set for the given UE so that its transmit power does not exceed the value set aside for the cellular radio interface. In fact the RAN needs to determine the number of resource blocks for the UE and that will have an impact on the total transmit power as well. Hence the RAN determines jointly the SINR target and the number of resource blocks that should be given to this UE taking into account the current channel estimate, quality of service requirement and the profile information. The specific algorithm used for this is not within the scope of the present invention, but it is obvious for a person skilled in the art that the profile information will have a large impact.

On the other hand, if the cellular radio access network does not have such an estimate, it may include an indication that the desired SINR target is meant as a maximum and that the UE is allowed to override this target according to the currently active communication profile. If the UE channel is unknown to the RAN, the RAN indicates to the UE that it could not set an SINR target (in the LTE power formula this is basically a parameter called P0), but the RAN allows the UE to use its maximum power on the specific resource blocks on which the UE is scheduled. This can be the case for example when the RAN knows that no UEs in the neighbor cell are using those resource blocks, so the UE will not cause interference even if it uses its maximal power. However, when the RAN knows that the UE uses a certain profile, then the maximum allowed power must still be compliant to that profile.

Alternatively, the RAN may estimate the maximum SINR target that a UE within its coverage area can reach even in a worst case situation. The RAN sends a parameter called P0 to the UE which corresponds to the SINR target. The UE uses this P0 when calculating the transmit power. Thus the estimate of the SINR target directly translates to one of the parameters what the RAN signals to the UE. When the RAN uses a high such SINR estimate, it will cause the UE to set a high power.

Thus, a network node of the RAN determines the transmit power control commands in accordance with the overall power usage and currently used profile of the UE.

Figure 3B:
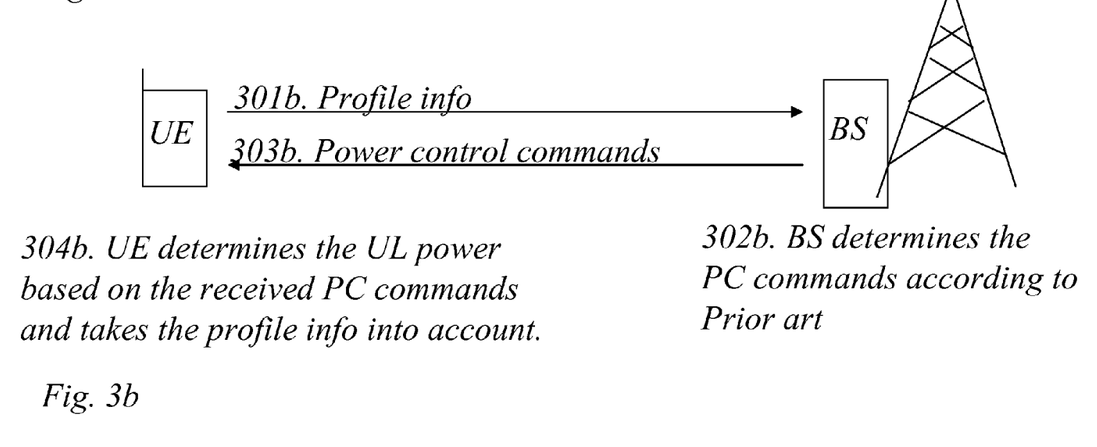

According to a further embodiment, said total transmit power budget is taken into account in the UE when calculating the transmit power levels to be used for uplink transmissions. As illustrated in FIG. 3b, the UE may transmit 301b the information comprising a total transmit power budget set aside for use over the multiple radio interfaces of the UE to the network node. This information may be provided to the network for e.g. scheduling purposes. The scheduling process needs to be aware of the total transmit power budget of the UE in order to determine the maximum number of resource blocks that this UE can be given. Also, the scheduler needs to be aware of the total transmit power budget to know when to schedule a UE in terms of its current channel conditions. For example, if the total transmit power budget is high, then the UE can be scheduled even when its channel is relatively bad, since it will be able to overcome the bad channel with setting high power. On the contrary, when the UE is power limited, the UE can only be scheduled when the UE has a good channel over which it can communicate even with low power. Further, the network node determines 302b the transmit power control commands according to prior art and sends 303b the commands to the UE. The UE takes the profile information into account when determining 304b the uplink transmit power based on the received transmit power control commands. Thus, the transmit power calculation algorithm in the UE is modified such that it considers the total transmit power budget of the currently active profile. Here the UE can override the power level that is indicated directly or indirectly by the network in the received transmit power control commands if the profile information indicates that there is extra power available and if the UE has received an indication from the network that the UE is allowed to override the calculated power level. Hence according to this embodiment, the UE sets the transmit power levels at the different radio interfaces such that its own power supply limitations and SAR restrictions are taken into account according to the profile information.

Figure 5A:
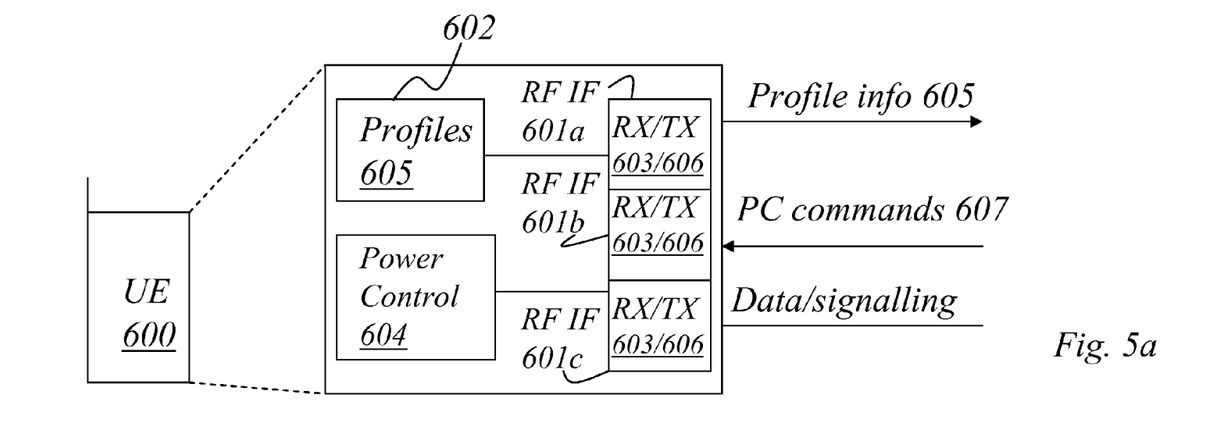
FIGS. 5a and 5b illustrate schematically a UE according to embodiments of the present invention.
Figure 5B:
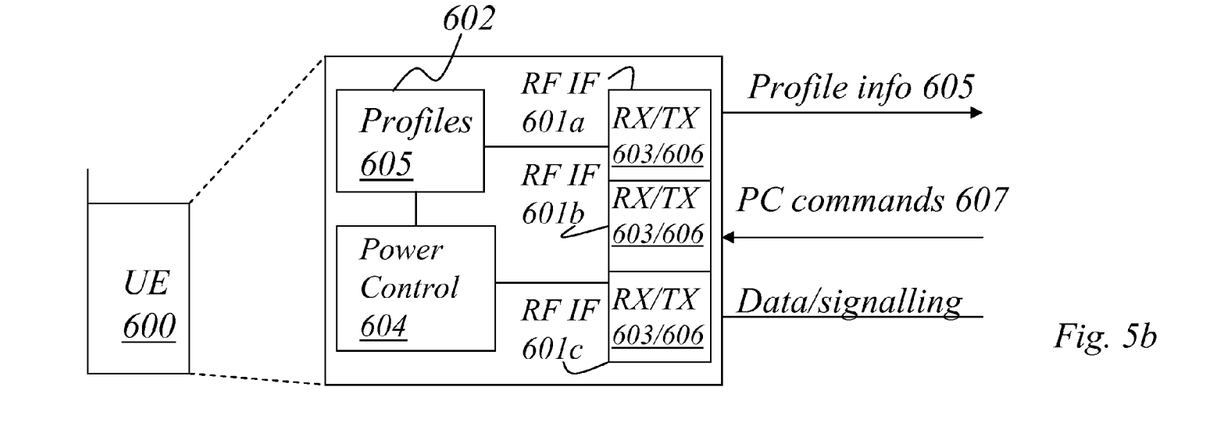

Turning now to FIGS. 5a and 5b which illustrate a UE 600 according to embodiments of the present invention. FIG. 5a illustrates the case when the network node 620 is configured to take the total transmit budget into account when determining the transmit power control commands to be sent to the UE 600. FIG. 5b illustrates the case when the UE 600 is configured to receive transmit power control commands and where the UE 600 is configured to take the information of the total transmit power budget into account when calculating the power levels to be used.

The UE as illustrated in FIGS. 5a and 5b comprises multiple radio interfaces 601a-c wherein at least one of the multiple interfaces is a cellular radio interface 601a. A radio interface implies circuitry and functionalities for transmission/reception according to one RAT. The UE 600 comprises a memory 602 for storing information 605 comprising a total transmit power budget set aside for use over the multiple radio interfaces of the UE and a receiver 603 configured to receive transmit power control commands 607 from a network node 620 on the cellular radio interface indicating whether the UE should increase or decrease or maintain the uplink transmit power on the cellular radio interface. Further a power control unit 604 configured to calculate transmit power levels to be used for uplink transmissions over the multiple radio interfaces based on the received power control commands is provided. The information of the total transmit power budget may comprise profile information comprising at least one profile for a communication scenario indicating at least a first and a second radio interface to be used associated with maximum transmit power levels to be used for the respective radio interfaces, wherein the sum of the maximum transmit power levels to be used for the respective radio interfaces shall not exceed the total transmit power budget of the UE. Accordingly, the memory 602 is configured to store said profiles.

In the embodiment illustrated in FIG. 5a, the UE 600 comprises a transmitter 606 configured to send the stored information 605 to the network node such that the network node can take the total transmit power budget into account when determining the power control commands to be sent to the UE 600.

In the embodiment illustrated in FIG. 5b, the power control unit 604 is configured to take said total transmit power budget 605 into account when calculating the power levels to be used for uplink transmissions.

With reference to FIGS. 5a and 5b, the receiver/transmitter 603/606 is also configured to receive/transmit data and other control signaling. This is however not within the scope of the present invention and therefore not further described.

Figure 6:
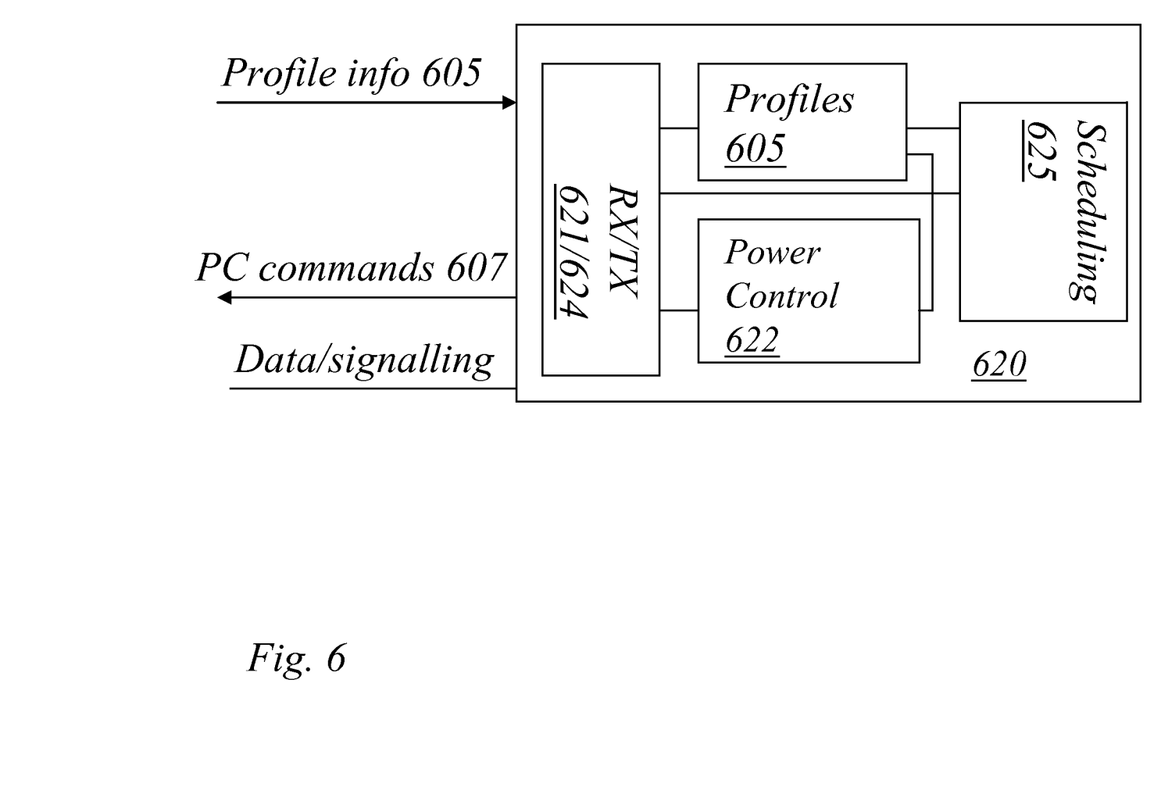
FIG. 6 illustrate schematically a base station according to embodiments of the present invention.

FIG. 6 illustrates a network node 620 exemplified by a base station in a cellular communication network for controlling uplink transmit power to be used by a UE. The network node 620 comprises a receiver 621 for receiving information 605 comprising a total transmit power budget set aside for use over the multiple radio interfaces of the UE. A power controller 622 is configured to determine transmit power control commands for the UE indicating whether the UE should increase or decrease or maintain the uplink transmit power taking said total transmit power budget 605 into account. The transmitter 624 is configured to send the determined transmit power control commands 607 to the UE 600. As mentioned above, the receiver/transmitter 621/624 is configured to receive/transmit data and other control signaling. In addition, it should be noted that the scheduling functionality 625 of the network node 620 may also use the profile information 605 to determine at which channel condition the particular UE should be scheduled, as well as which resource blocks frequency channels should be scheduled for that UE and the maximum number of resource blocks that can be simultaneously scheduled for this UE.

The received information 605 of the total transmit power budget may comprise profile information. As illustrated in FIG. 2, the profile information may comprise at least one profile for a communication scenario indicating at least a first and a second radio interface to be used associated with maximum transmit power levels to be used for the respective radio interfaces, wherein the sum of the maximum transmit power levels to be used for the respective radio interfaces shall not exceed the total transmit power budget of the UE.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a User Equipment, UE, for controlling uplink transmit power to be used by multiple radio interfaces thereof, wherein at least one of the multiple interfaces is a cellular radio interface, the method comprising the steps of:
storing information comprising a total transmit power threshold, which the US is not permitted to exceed when simultaneously transmitting over the multiple radio interfaces of the UE;
receiving, from a network node, on the cellular radio interface, a transmit power control command indicating whether the UE is to increase, to decrease, or to maintain an uplink transmit power level on the cellular radio interface; and
calculating, based on the received transmit power control command for the cellular radio interface, transmit power levels to be used for uplink transmissions on the multiple radio interfaces other than the cellular radio interface such that said total transmit power threshold is not exceeded.

2. The method according to claim 1, wherein the stored information comprises profile information comprising at least one profile for a communication scenario indicating at least a first and a second radio interface of said multiple radio interfaces to be used associated with maximum transmit power levels to be used for the respective first and second radio interfaces, wherein the sum of the maximum transmit power levels to be used for the respective radio interfaces shall not exceed the total transmit power threshold.

3. The method according to claim 1, wherein the method comprises the further step of:
sending the stored information to the network node to enable the network node to take into account the total transmit power threshold when determining the transmit power control command to be sent to the UE.

4. The method according to claim 1, wherein said total transmit power threshold is taken into account in the UE when calculating the transmit power levels to be used for uplink transmissions.

5. A method in a network node of a cellular communication network for controlling uplink transmit power to be used by a User Equipment, UE, transmitting on multiple radio interfaces, one of which is a cellular radio interface, the method comprising the steps of:
receiving, from the UE, profile information indicating transmit power levels the UE is using on a subset of the multiple radio interfaces of the UE, and a maximum total transmit power threshold, which the UE is not permitted to exceed when simultaneously transmitting on the subset of the multiple radio interfaces;
determining transmit power control commands for the UE indicating whether the UE is to increase, to decrease, or to maintain an uplink transmit power level on the cellular radio interface, while taking into account, by the network node, said profile information and the maximum total transmit power threshold, and
sending the determined transmit power control commands to the UE.

6. The method according to claim 5, wherein the received profile information comprises at least one profile for a communication scenario indicating at least a first and a second radio interface to be used associated with maximum transmit power levels to be used for the respective first and second radio interfaces, wherein the sum of the maximum transmit power levels to be used for the respective radio interfaces shall not exceed the total transmit power threshold.

7. A User Equipment, UE, for controlling uplink transmit power to be used by multiple radio interfaces of the UE, wherein at least one of the multiple interfaces is a cellular radio interface, the UE comprising:
a memory for storing information comprising a total transmit power budget which the US is not permitted to exceed when simultaneously transmitting over the multiple radio interfaces of the UE;
a receiver for receiving a transmit power control command from a network node on the cellular radio interface indicating whether the UE is to increase, to decrease, or to maintain an uplink transmit power on the cellular radio interface; and
a power control unit for calculating, based on the received power control command for the cellular radio interface, transmit power levels to be used for uplink transmissions on the multiple radio interfaces other than the cellular radio interface;
wherein the said total transmit power threshold is not exceeded.

8. The UE according to claim 7, wherein the stored information comprises profile information comprising at least one profile for a communication scenario indicating at least a first and a second radio interface to be used associated with maximum transmit power levels to be used for the respective first and second radio interfaces, wherein the sum of the maximum transmit power levels to be used for the respective first and second radio interfaces shall not exceed the total transmit power threshold.

9. The UE according to claim 7, wherein the UE comprises a transmitter for sending the stored information to the network node to enable the network node to take the total transmit power threshold into account when determining the power control command to be sent to the UE.

10. The UE according to claim 7, wherein the power control unit is configured to take into account said total transmit power threshold when calculating the power levels to be used for uplink transmissions.

11. A network node of a cellular communication network for controlling uplink transmit power to be used by a User Equipment, UE, comprising multiple radio interfaces, the network node comprising:

a receiver for receiving, from the UE, profile information indicating transmit power levels the UE is using on a subset of the multiple radio interfaces of the UE, and a maximum total transmit power threshold, which the UE is not permitted to exceed when simultaneously transmitting on the subset of the multiple radio interfaces;

a power controller for determining transmit power control commands for the UE indicating whether the UE is to increase, to decrease, or to maintain an uplink transmit power level on the cellular radio interface, while taking into account said profile information and the maximum total transmit power threshold; and a transmitter for sending the determined transmit power control commands to the UE.

12. The network node according to claim 11, wherein the received profile information comprises at least one profile for a communication scenario indicating at least a first and a second radio interface to be used associated with maximum transmit power levels to be used for the respective first and second radio interfaces, wherein the sum of the maximum transmit power levels to be used for the respective radio interfaces shall not exceed the total transmit power threshold.

13. The network node according to claim 11, wherein the network node is a base station.

* * * * *